(12) United States Patent
Duan et al.

(10) Patent No.: US 6,243,013 B1
(45) Date of Patent: Jun. 5, 2001

(54) CASCADED DC VOLTAGES OF MULTIPLE ANTENNA RF TAG FRONT-END CIRCUITS

(75) Inventors: Dah Weih Duan, Yorktown Heights; Daniel J. Friedman, Tarrytown, both of NY (US)

(73) Assignee: Intermec IP Corp., Wilmington, DE (US)

( * ) Notice: Subject to any disclaimer, the term of this patent is extended or adjusted under 35 U.S.C. 154(b) by 0 days.

(21) Appl. No.: 09/227,768

(22) Filed: Jan. 8, 1999

(51) Int. Cl.[7] ............................................. G08B 13/14

(52) U.S. Cl. ........................... 340/572.7; 340/572.4

(58) Field of Search ............................. 340/572.7, 572.5, 340/572.4, 572.1, 572.8, 10.2, 10.42; 343/767, 793; 235/375

(56) References Cited

U.S. PATENT DOCUMENTS

| 5,430,441 | * | 7/1995 | Bickley et al. | 340/572.7 |
| 5,517,195 | * | 5/1996 | Narlow et al. | 340/572 |
| 5,682,143 | * | 10/1997 | Brady et al. | 340/572.7 |
| 6,011,488 | * | 1/2000 | Büsser | 340/572.4 |
| 6,147,605 | * | 11/2000 | Vega et al. | 340/572.7 |

OTHER PUBLICATIONS

Graf et al, *Encyclopedia of Electronic Circuits* vol. 4 Tab Books, p. 635, 1992.*

* cited by examiner

Primary Examiner—Jeffery Hofsass
Assistant Examiner—John Tweel, Jr.
(74) Attorney, Agent, or Firm—Rodney T. Hodgson

(57) ABSTRACT

An RF transponder having a plurality of antennas is disclosed, where the voltages produced by the plurality of antennas are cascaded to produce a tag voltage higher than that produced by a single antenna.

20 Claims, 2 Drawing Sheets

CASCADED DC VOLTAGES OF MULTIPLE ANTENNA RF TAG FRONT-END CIRCUITS

FIELD OF THE INVENTION

The field of the invention is the field of Radio Frequency (RF) transponders (RF Tags) which receive RF electromagnetic radiation from a base station and send information to the base station by modulating the load of an RF antenna.

BACKGROUND OF THE INVENTION

RF Tags can be used in a multiplicity of ways for locating and identifying accompanying objects, items, animals, and people, whether these objects, items, animals, and people are stationary or mobile, and transmitting information about the state of the objects, items, animals, and people. It has been known since the early 60's in U.S. Pat. No. 3,098,971 by R. M. Richardson, that electronic components on a transponder could be powered by radio frequency (RF) power sent by a "base station" at a carrier frequency and received by an antenna on the tag. The signal picked up by the tag antenna induces an alternating current in the antenna which can be rectified by an RF diode and the rectified current can be used for a power supply for the electronic components. The tag antenna loading is changed by something that was to be measured, for example a microphone resistance in the cited patent. The oscillating current induced in the tag antenna from the incoming RF energy would thus be changed, and the change in the oscillating current led to a change in the RF power radiated from the tag antenna. This change in the radiated power from the tag antenna could be picked up by the base station antenna and thus the microphone would in effect broadcast power without itself having a self contained power supply. In the cited patent, the antenna current also oscillates at a harmonic of the carrier frequency because the diode current contains a doubled frequency component, and this frequency can be picked up and sorted out from the carrier frequency much more easily than if it were merely reflected. Since this type of tag carries no power supply of its own, it is called a "passive" tag to distinguish it from an active tag containing a battery. The battery supplies energy to run the active tag electronics, but not to broadcast the information from the tag antenna. An active tag also changes the loading on the tag antenna for the purpose of transmitting information to the base station.

The "rebroadcast" or "reflection" of the incoming RF energy at the carrier frequency is conventionally called "back scattering", even though the tag broadcasts the energy in a pattern determined solely by the tag antenna and most of the energy may not be directed "back" to the transmitting antenna.

In the 70's, suggestions to use tags with logic and read/write memories were made. In this way, the tag could not only be used to measure some characteristic, for example the temperature of an animal in U.S. Pat. No. 4,075,632 to Baldwin et. al., but could also identify the animal. The antenna load was changed by use of a transistor. A transistor switch also changed the loading of the transponder in U.S. Pat. No. 4,786,907 by A. Koelle.

Prior art tags have used electronic logic and memory circuits and receiver circuits and modulator circuits for receiving information from the base station and for sending information from the tag to the base station.

The continuing march of semiconductor technology to smaller, faster, and less power hungry has allowed enormous increases of function and enormous drop of cost of such tags. Presently available research and development technology will also allow new function and different products in communications technology.

One fundamental problem with passive tags is that the range is limited by the voltage picked up by the tag antenna and rectified by the tag power conditioning circuits. The voltage must be high enough to run the tag electronics, and the voltage is generally the limiting factor in determining the distance from the base station antenna at which the tags may be used. Even active tags having a battery to run the tag electronics are limited in the voltage picked up by the tag antenna.

RELATED PATENTS AND APPLICATIONS

Related U.S. Patents assigned to the assignee of the present invention include: U.S. Pat. Nos. 5,521,601; 5,528,222; 5,538,803; 5,550,547; 5,552,778; 5,554,974; 5,563,583; 5,565,847; 5,606,323; 5,635,693; 5,673,037; 5,680,106;5,682,143; 5,729,201; 5,729,697; 5,736,929; 5,739,754; 5,767,789; 5,777,561; 5,786,626; 5,812,065; and 5,821,859. U.S. Patent applications assigned to the assignee of the present invention include: application No. 08/626,820, filed: Apr. 3, 1996, entitled "Method of Transporting RF Power to Energize Radio Frequency Transponders", by Heinrich, Zai, et al. (now U.S. Pat. No. 5,850,181, issued Dec. 15, 1998); application No. 08/694,606 filed Aug. 9, 1996 entitled RFID System with Write Broadcast Capability by Cesar et al.; application Ser. No. 08/681,741 filed Jul. 29, 1996 entitled RFID Transponder with Electronic Circuitry Enabling and Disabling Capability, by Heinrich, Goldman et al.; application Ser. No. 09/153,617 filed Sep. 12, 1998, entitled RFID Interrogator Signal Processing System for Reading Moving Transponder, by Zai et al; U.S. application filed Nov. 13, 1998 by Duan et al. entitled "RF Identification Transponder having a spiral antenna; U.S. application filed Nov. 13, 1998 by Duan et al. entitled "RF Identification Transponder having a helical antenna; U.S. application filed Nov. 13, 1998 by Duan et al. entitled "RF Identification Transponder employing patch antenna; and U.S. application filed Nov. 13, 1998 by Kodukula et al. entitled "RF Identification Transponder having a spiral antenna; and U.S. application filed Nov. 13, 1998 by Duan et al. entitled "Distributed Impedance matching circuit for high reflection coefficient load. The above identified U.S. Patents and U.S. Patent applications are hereby incorporated by reference.

OBJECTS OF THE INVENTION

It is an object of the invention to produce an RF transponder comprising circuits which can be made at low cost. It is a further object of the invention to produce an RF transponder which can be used at high frequencies. It is a further object of the invention to produce an RF transponder with maximum range. It is a further object of the invention to produce an RF transponder with circuits which require very little current. It is a further object of the invention to produce an electronic chip for an RF transponder which can be produced simply with standard semiconductor manufacturing techniques. It is a further object of the invention to provide an RF transponder having a novel multiple antenna power and information receiving circuitry for maximum range.

SUMMARY OF THE INVENTION

The present invention is a system, apparatus and method to use multiple antennas to receive RF power and signals from a base station, where circuitry is provided which will cascade the DC voltages produced by rectifying the signals at each of the multiple antennas.

DETAILED DESCRIPTION OF THE INVENTION

Figure 1:
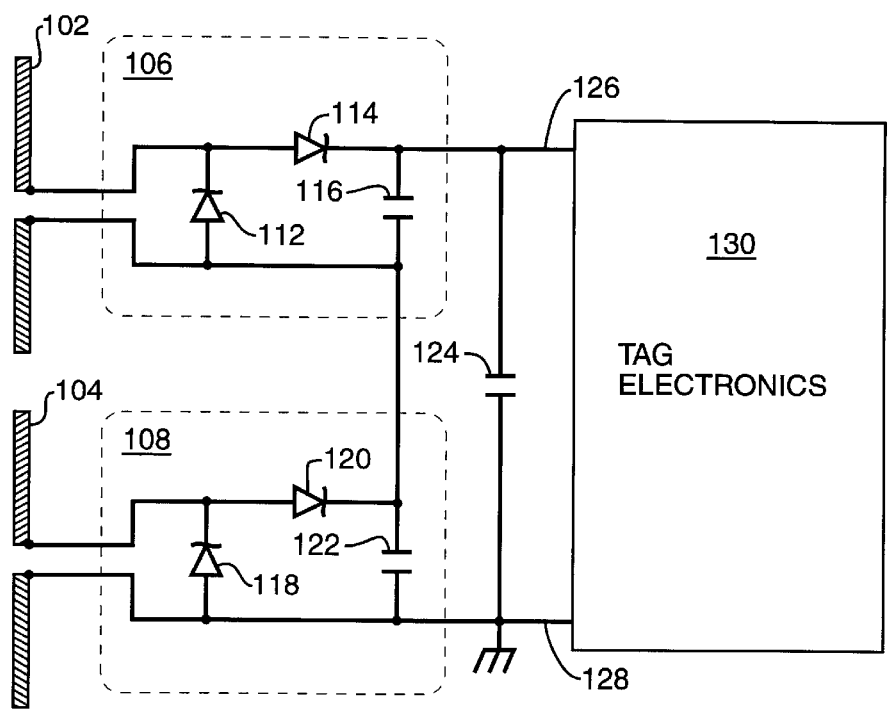
FIG. 1 shows a sketch of a circuit diagram for receiving power from two tag antennas.

FIG. 1 shows a sketch of a circuit diagram for receiving power from two tag antennas 102 and 104. Tag antennas 102 and 104 are sketched here as dipole antennas, but they could be any one or any combination of dipole, patch, loop, or slot antennas as are known in the art. Tag antennas 102 and 104 could also be any one of the above and/or any one or any combination of DOG, HOG, or SOG antennas which are described in great detail in: U.S. application filed Nov. 13, 1998 by Duan et al. entitled "RF Identification Transponder having a spiral antenna; U.S. application filed Nov. 13, 1998 by Duan et al. entitled "RF Identification Transponder having a helical antenna; U.S. application filed Nov. 13, 1998 by Duan et al. entitled "RF Identification Transponder employing patch antenna; and U.S. application filed Nov. 13, 1998 by Kodukula et al. entitled "RF Identification Transponder having a spiral antenna; and U.S. application filed Nov. 13, 1998 by Duan et al. entitled "Distributed Impedance matching circuit for high reflection coefficient load", which are included by reference in this application. Of particular importance to the invention are the innovative impedance matching schemes noted in the above identified applications. Tag antennas 102 and 104 are shown in FIG. 1 providing power and information to voltage doubling circuits 106 and 108 respectively. Voltage doubling circuits 106 and 108 are well known voltage doubling circuits for providing power to passive RF tags, and could be replaced with single rectification circuits or higher order cascade voltage multiplication circuits as known in the art. RF diodes 112 and 114 act together to charge capacitor 116 to a voltage twice the voltage available with a single RF diode. Elements 118, 120 and 122 perform a similar function in circuit 130. Circuits 106 and 108 charge capacitor 124 which may act as a power supply for tag electronics 130, or may act as a modulated signal receiver for tag electronics in the case that the tag electronics 128 have a battery power supply as in the case of an active RF Tag. Power or signals are fed into the tag electronic section over lines 126 and 128 respectively. Line 128 is shown as the conventional ground.

The tag electronics may also receive modulated signals by many other means than by measuring voltage across capacitor 124. For example, signals may be recovered by measuring the voltage across capacitors 116 or 122, or receiving circuits may be added as shown in U.S. patent application Ser. No. 08/733,684 which are completely apart from the power receiving circuits 106 and 108.

Modulation of the antenna reflectance characteristics to send signals from the tag to the base station may be performed by modifying the bias conditions on one or more of diodes 112, 114, 118, 120, or by shorting out capacitors 116, 122, and/or 124 under control of the tag electronic circuitry. (Circuits not shown).

Figure 2:
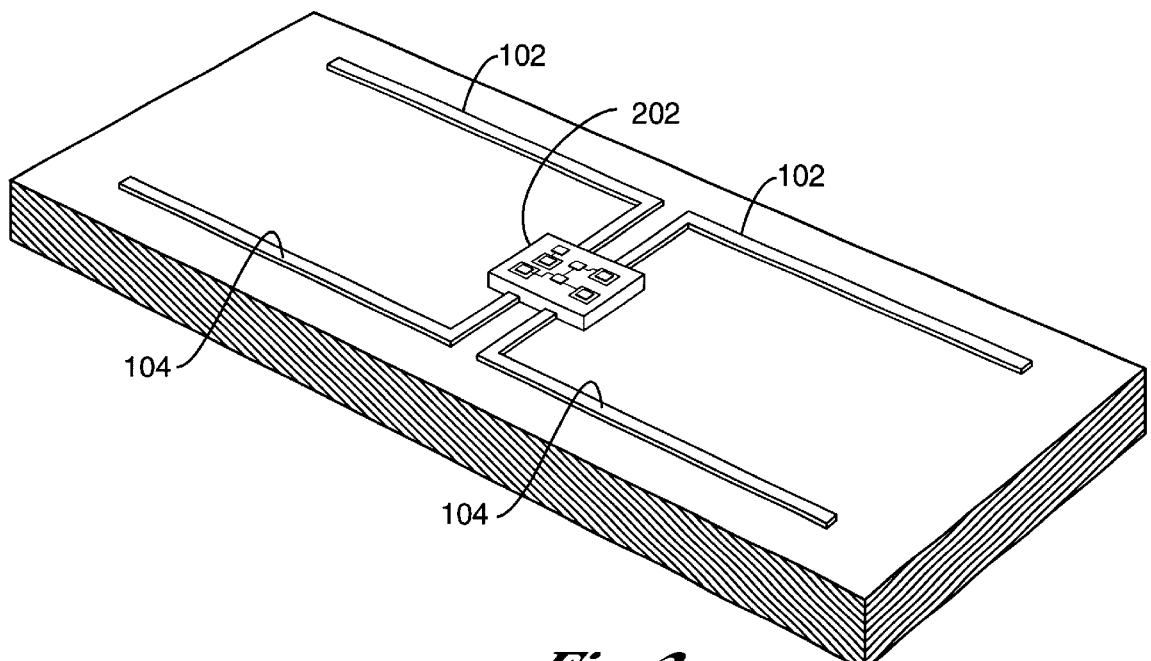
FIG. 2 shows a sketch of an RF tag having two dipole antennas.

FIG. 2 shows a sketch of an RF tag having two dipole antennas 102 and 104 connected to a semiconductor chip 202 which contains the tag electronic circuitry and the RF diodes and capacitors shown in FIG. 1. The dipole antennas 102 and 104 may be close together and closely coupled as shown in FIG. 2, or they may be widely separated (by more than the wavelength of the RF radiation which they are receiving) and hence not closely coupled.

Figure 3:
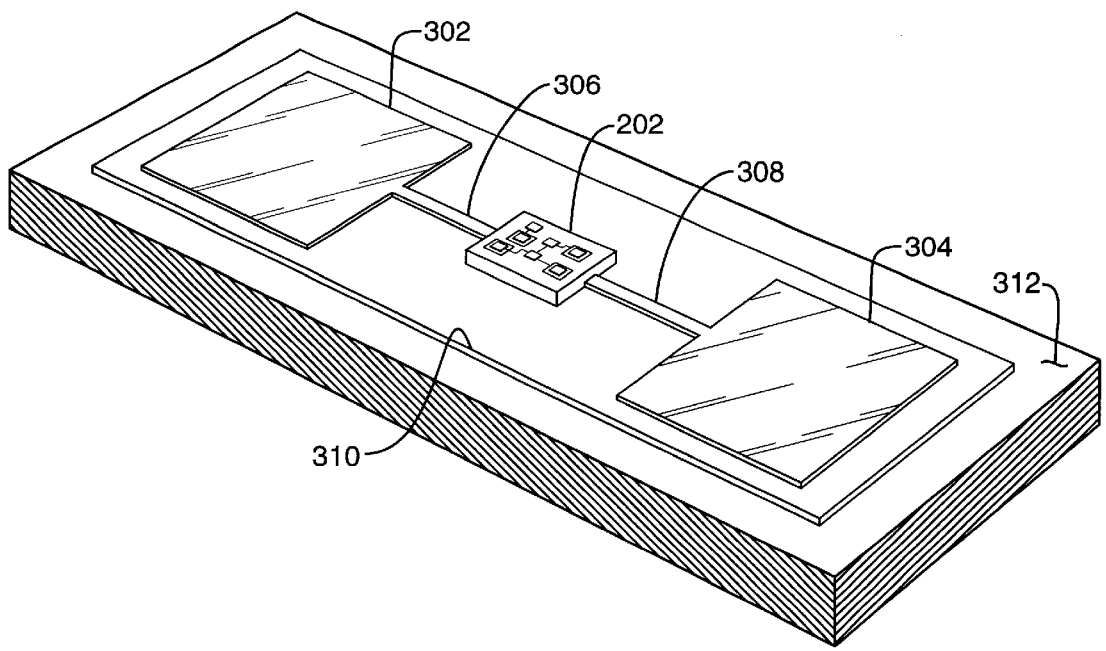
FIG. 3 shows a sketch of an RF tag having two patch antennas.

FIG. 3 shows a sketch of an RF tag having two patch antennas 302 and 304 feeding power or information to a semiconductor chip 202 through impedance matching sections 306 and 308. Impedance matching strips 306 and 308 may be short so that patch antennas 302 and 304 are closely coupled, or may be long so that they are not closely coupled. Patch antennas 302 and 304 are made from electrically conducting material such as metal or conducting polymer material, and are generally connected to a dielectric material 310 which separated patches 302 and 304 from a conducting ground plane 312.

From FIGS. 2 and 3, it is easy to see that one patch antenna may be combined with one dipole antenna to produce more voltage than a single antenna. Note also that patch antennas 302 and 304 could both be circular polarized antennas of opposite handedness, so that at least some voltage would be generated by the combination, where a single antenna might not receive any power or information. In the same way, dipole antennas 102 and 104 could be constructed so that they are mutually perpendicular, instead of parallel as shown. In this case, linearly polarized RF radiation would give at least some power to the combination of the two antennas.

Figure 4:
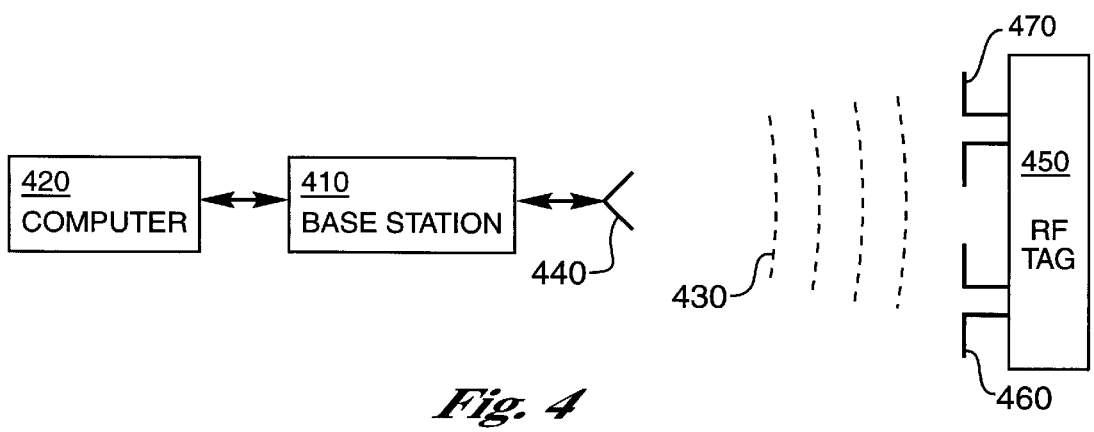
FIG. 4 shows a sketch of a system for communicating power and information between a base station and an RF tag

FIG. 4 shows a sketch of a base station 410 connected to a computer 420 which is used to send and receive RF signals 430 through antenna 440 to and from an RF tag 450 having two antennas 460 and 470.

Obviously, many modifications and variations of the present invention are possible in light of the above teachings. It is therefore to be understood that, within the scope of the appended claims, the invention may be practiced otherwise then as specifically described.

We claim:

1. A radio frequency (RF) transponder (tag), comprising:
   a first and a second tag antenna for receiving information signals from a base station;
   tag information receiving electronics, the tag information receiving eletronics rectifying the signals from each of the first and the second antennas in a first and a second voltage generating circuit respectively to produce a first and a second voltage, the tag information receiving electronics connecting the first and the second voltage generating circuits in series to provide a tag voltage substantially higher than the voltage available from either the first or the second voltage generating circuit.

2. The RF tag of claim 1, wherein the tag information receiving electronics rectifies the signal from at least one of the first or second tag antennas in a voltage multiplication circuit.

3. The RF tag of claim 2, wherein the voltage multiplication circuit is a voltage doubling circuit.

4. The RF tag of claim 1, wherein at least one of the first or second tag antennas is a dipole antenna.

5. The RF tag of claim 1, wherein at least one of the first or second tag antennas is a patch antenna.

6. A passive radio frequency (RF) transponder (tag), comprising:
   a plurality of tag antennas for receiving power and information signals from a base station;
   a tag power supply for receiving power from the plurality of tag antennas and supplying power at a supply voltage VDD to tag electronics, the tag receiving power only from the plurality of tag antennas, the tag power supply rectifying the signals from each of the plurality of antennas to produce a plurality of voltages, the tag power supply connecting at least two of the plurality of voltages in series to provide power to the tag at a substantially higher voltage than either of the at least two voltages.

7. The RF tag of claim 6, wherein the tag power supply rectifies the signal from at least one of the plurality of antennas in a voltage multiplication circuit.

8. The RF tag of claim 7, wherein the voltage multiplication circuit is a voltage doubling circuit.

9. The RF tag of claim 6, wherein at least one of the plurality of antennas is a dipole antenna.

10. The RF tag of claim 6, wherein at least one of the plurality of antennas is a patch antenna.

11. A method of providing power to a radio frequency (RF) transponder (tag), comprising:

receiving signals from a base station using a plurality of tag antennas;

rectifying the signals from each of the plurality of antennas to produce a plurality of voltages, connecting at least two of the plurality of voltages in series to provide power to the tag at a substantially higher voltage than either of the at least two voltages.

12. The method of claim 11, wherein the step of rectifying the signal from at least one of the plurality of antennas uses a voltage multiplication circuit.

13. The method of claim 12, wherein the voltage multiplication circuit is a voltage doubling circuit.

14. The method of claim 11, wherein at least one of the plurality of antennas is a dipole antenna.

15. The method of claim 11, wherein at least one of the plurality of antennas is a patch antenna.

16. A system comprising:

a base station;

at least one passive radio frequency (RF) transponder (tag), comprising:

a plurality of tag antennas for receiving power and information signals from a base station;

a tag power supply for receiving power from the plurality of tag antennas and supplying power at a supply voltage VDD to tag electronics, the tag power supply rectifying the signals from each of the plurality of antennas to produce a plurality of voltages, the tag power supply connecting at least two of the plurality of voltages in series to provide power to the tag at a substantially higher voltage than either of the at least two voltages.

17. The system of claim 16, wherein the tag power supply rectifies the signal from at least one of the plurality of antennas in a voltage multiplication circuit.

18. The system of claim 17, wherein the voltage multiplication circuit is a voltage doubling circuit.

19. The system of claim 16, wherein at least one of the plurality of antennas is a dipole antenna.

20. The system of claim 16, wherein at least one of the plurality of antennas is a patch antenna.

* * * * *